Sept. 16, 1947.  G. H. WIELAND  2,427,431
CLOSET GASKET
Filed June 16, 1944

INVENTOR.
GERALD H. WIELAND.
BY
Lockwood, Goldsmith & Galt,
ATTORNEYS.

Patented Sept. 16, 1947

2,427,431

UNITED STATES PATENT OFFICE 2,427,431

CLOSET GASKET

Gerald H. Wieland, Indianapolis, Ind., assignor to Rapid Specialty Company, Noblesville, Ind.

Application June 16, 1944, Serial No. 540,681

3 Claims. (Cl. 288—33)

This invention relates to a closet gasket.

The chief object of this invention is to provide a gasket that is preformed for immediate installation and which when installed forms a water and odor proof seal and which, as distinguished from putty, will not dry out nor crumble.

The chief feature of this gasket resides in prefabrication and retention of sealing properties while in use and is characterized by having the advantages of a rubber gasket without the aging, etc., disadvantages thereof and by having the advantages of a putty seal without the aforementioned disadvantages thereof.

One special feature of this invention resides in the composition of the gasket, same consisting of a pigment and a vehicle, the natures of which will be more fully set forth hereinafter and which has a gray appearance like putty.

Other objects and features also will appear more fully hereinafter.

Figure 1:
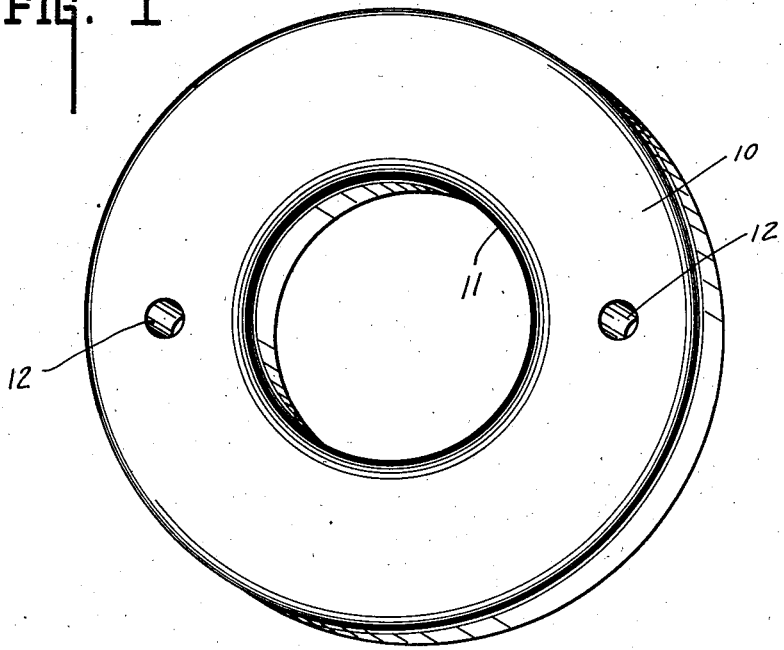

The full nature of the invention will be understood from the accompanying drawings and the following description and claims:

In the drawings, Fig. 1 is a perspective view of the preformed gasket embodying the invention.

Figure 2:
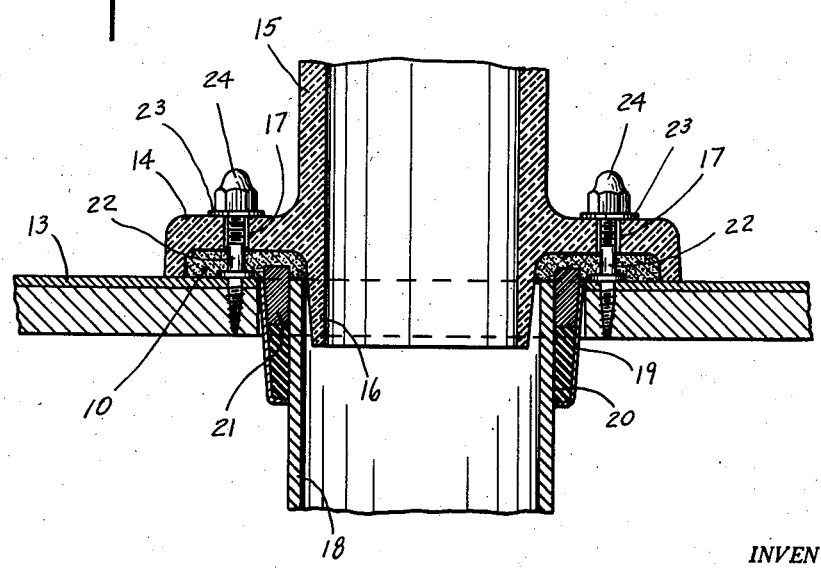

Fig. 2 is a central section of a toilet installation with the invention included therein.

In Fig. 1, 10 indicates a flat ring with the central opening 11 and diametrically positioned openings 12.

In Fig. 2, 13 indicates the finished surface of the supporting floor, 14 the supporting base flange of a toilet bowl 15, having the outlet lip 16 projecting beyond the plane of the base flange. The latter is apertured at 17. The waste line 18, usually soil or I. P. S. pipe, may be enveloped at its upper end by sleeve 19 and the space therebetween is sealed by oakum or the like 20 and capped by lead ring 21.

The lip 16 nests in the upper end of pipe 18. Studs 22 are suitably anchored to the floor and project upwardly therefrom and are seated in apertures 12 of the gasket 10, the lip portion 16 of the bowl being encircled by the gasket and seating in the central opening 11 therein. Washers 23 and nuts 24 are drawn down on studs 22 to rigidly secure the bowl in place with the gasket included between the bowl and waste and pressure deformable for sealing said connection against water and odor leakage.

Since the gasket is preformed there is no surplus to squeeze out between the floor and bowl and cause floor damage. Since the gasket material does not appreciably dry out and does not crumble, maintenance of the leak proof character—as to water and odors—is substantially indefinite.

The composition of said gasket may be pigment 40% to 85% and the vehicle 15% to 60%.

The pigment may have a composition as follows:

|  | Per cent |
|---|---|
| Asbestos | 1 to 40 |
| Fibrous magnesium silicate | 1 to 40 |
| Lithopone | 1 to 40 |
| Aluminum silicate (including particles of laminar structure) | 1 to 97 |

The vehicle may have a composition as follows:

|  | Per cent |
|---|---|
| Blown linseed oil | 60 to 99.9 |
| Mineral spirits | 0 to 39 |
| Anti-skinning agent | .05 to 5 |
| Deodorant | .05 to 5 |

However, the preferred composition found most suitable for general use is as follows:

|  | Per cent |
|---|---|
| Pigment | 64 to 74 |
| Vehicle | 26 to 36 |

The pigment preferably has a composition as follows:

|  | Per cent |
|---|---|
| Fibrous magnesium silicate | 5 to 15 |
| Asbestos | 15 to 25 |
| Lithopone | 0 to 4 |
| Aluminum silicate (including particles of laminar structure) | 60 to 80 |

The vehicle preferably has a composition as follows:

|  | Percent |
|---|---|
| Blown linseed oil | 84 to 94 |
| Mineral spirits | 5 to 15 |
| Anti-skinning agent | 0.2 to 2.0 |
| Deodorant | 0.1 to 0.8 |

From the foregoing, therefore, it will be observed that the gasket material includes predominately aluminum silicate (including particles of laminar structure) and blown linseed oil. Associated therewith are lesser amounts of fibrous magnesium silicate, asbestos and mineral spirits and further associated therewith are comparatively minor amounts of the remaining ingredients, although the importance of same is not indicated by the proportion specified. The vehicle to pigment ratio may vary from one-fourth to one-third of the composition. Bulk or body ingredients include all but the lithopone of the pigment, and the blown linseed oil of the vehicle.

The foregoing proportions are set forth by way of example and not necessarily by way of limitation.

The invention claimed is:

1. A non-rubber preformed gasket suitable for use as a putty substitute having the advantages of both and the disadvantages of neither and and usable between a waste and toilet bowl, said gasket having form retaining characteristics and deformable as required in use and including a ring with diametrically positioned apertures therethrough, the ring with the apertures being preformed and maintainable in that formation until used and comprised of a homogeneous mixture of a vehicle and pigment, which mixture does not harden with age, does not crack nor crumble when exposed to long periods of atmospheric conditions and which further is of water, moisture and odor sealing character, the vehicle comprising predominantly blown linseed oil and a lesser amount of mineral spirits and the pigment comprising predominantly aluminum silicate and an appreciably lesser amount of asbestos, a still smaller amount of fibrous magnesium silicate and an even smaller amount of lithopone, the pigment to vehicle ratio being from between approximately 2 to 1 to 3 to 1.

2. A preformed gasket material as defined by claim 1 wherein the aluminum silicate includes particles of laminar character.

3. A gasket as defined by claim 1 wherein the vehicle proportions are approximately: blown linseed oil, 84% to 94%; mineral spirits, 5% to 15%; and the pigment proportions are approximately: fibrous magnesium silicate, 5% to 15%; asbestos, 15% to 25%; aluminum silicate, 60% to 80%; and lithopone, 0 to 4%.

GERALD H. WIELAND.

REFERENCES CITED

The following references are of record in the file of this patent:

UNITED STATES PATENTS

| Number | Name | Date |
| --- | --- | --- |
| 679,459 | Johnson et al. | July 30, 1901 |
| 2,152,719 | Williams | Apr. 4, 1939 |

FOREIGN PATENTS

| Number | Country | Date |
| --- | --- | --- |
| 452,536 | Great Britain | 1936 |

OTHER REFERENCES

The Chemical Formulary—H. Bennett—Vol. V, 1941, pages 40 and 41; Chemical Publishing Co., Inc., Brooklyn, N. Y. (Copy in Div. 64.)